US010928205B2

(12) United States Patent
Kawauchi et al.

(10) Patent No.: US 10,928,205 B2
(45) Date of Patent: Feb. 23, 2021

(54) IN-VEHICLE DEVICE AND VEHICLE

(71) Applicant: Clarion Co., Ltd., Saitama (JP)

(72) Inventors: Takashi Kawauchi, Tokyo (JP); Eriko Ando, Tokyo (JP); Makoto Kayashima, Tokyo (JP)

(73) Assignee: CLARION CO., LTD., Saitama (JP)

( * ) Notice: Subject to any disclaimer, the term of this patent is extended or adjusted under 35 U.S.C. 154(b) by 203 days.

(21) Appl. No.: 16/087,587

(22) PCT Filed: Jan. 30, 2017

(86) PCT No.: PCT/JP2017/003239
§ 371 (c)(1),
(2) Date: Sep. 21, 2018

(87) PCT Pub. No.: WO2017/163611
PCT Pub. Date: Sep. 28, 2017

(65) Prior Publication Data
US 2019/0107399 A1    Apr. 11, 2019

(30) Foreign Application Priority Data
Mar. 23, 2016    (JP) .............................. JP2016-058929

(51) Int. Cl.
G01C 21/28    (2006.01)
G01S 19/23    (2010.01)
(Continued)

(52) U.S. Cl.
CPC .............. *G01C 21/28* (2013.01); *G01S 19/23* (2013.01); *G07C 5/08* (2013.01); *G08G 1/09* (2013.01); *G08G 1/0968* (2013.01)

(58) Field of Classification Search
CPC .......... G01C 21/28; G01S 19/23; G07C 5/08; G08G 1/09; G08G 1/0968
See application file for complete search history.

(56) References Cited

U.S. PATENT DOCUMENTS 5,184,304 A      2/1993   Huddle
5,257,195 A *   10/1993  Hirata ..................... G01S 19/49
                                                                  701/472
(Continued)

FOREIGN PATENT DOCUMENTS

EP    1985971 A2    10/2008
EP    2128645 A1    12/2009
(Continued)

OTHER PUBLICATIONS

International Search Report for related International Application No. PCT/JP2017/003239, dated May 9, 2017, English abstract provided, 9 pages.

(Continued)

*Primary Examiner* — Aaron L Troost
(74) *Attorney, Agent, or Firm* — Procopio, Cory, Hargreaves & Savitch LLP

(57) ABSTRACT

An in-vehicle device includes: an acquiring unit that acquires comparison information; and a detecting unit that detects an abnormality in a positioning device based on position information on a host vehicle output from the positioning device mounted in the host vehicle and the comparison information different from the position information.

7 Claims, 13 Drawing Sheets

(51) Int. Cl.
G08G 1/09 (2006.01)
G08G 1/0968 (2006.01)
G07C 5/08 (2006.01)

(56) References Cited

U.S. PATENT DOCUMENTS

2005/0010364 A1* 1/2005 Moser .................. G01S 19/074
 701/472
2016/0341557 A1 11/2016 Kondo et al.

FOREIGN PATENT DOCUMENTS

| EP | 2172743 | A2 | | 4/2010 | | |
|----|---------|----|----|--------|----|----|
| EP | 2840357 | A1 | * | 2/2015 | .......... | G01C 21/005 |
| EP | 2840357 | A1 | | 2/2015 | | |
| JP | H07-301541 | A | | 11/1995 | | |
| JP | H10-104015 | A | | 4/1998 | | |
| JP | 2008-008628 | A | | 1/2008 | | |
| JP | 2009-145167 | A | | 7/2009 | | |
| JP | 2010-002260 | A | | 1/2010 | | |
| JP | 2015-141073 | A | | 8/2015 | | |

OTHER PUBLICATIONS

Extended European Search Report for related European Application No. 17769658.0 dated Oct. 22, 2019; 12 pages.

* cited by examiner

FIG. 5

VEHICLE INFORMATION PACKET A600

| VEHICLE ID | LATITUDE1 INFORMATION | LATITUDE2 INFORMATION | LONGITUDE1 INFORMATION | LONGITUDE2 INFORMATION | POSITIONING TIME | VEHICLE ADVANCING DIRECTION | VEHICLE TRAVELING SPEED |
|---|---|---|---|---|---|---|---|
| 100 | 4807.038247 | N | 1131.324523 | E | 12:35:19.00 | 60 | 60 |
| A601 | A602 | A603 | A604 | A605 | A606 | A607 | A608 |

FIG. 6

| LATITUDE 1 INFORMATION | LATITUDE 2 INFORMATION | LONGITUDE 1 INFORMATION | LONGITUDE 2 INFORMATION | POSITIONING TIME |
|---|---|---|---|---|
| 4807.038247 | N | 1131.324523 | E | 12:35:19.00 |
| A701 | A702 | A703 | A704 | A705 |

GPS INFORMATION PACKET A700

FIG. 8

| | LATITUDE 1 INFORMATION | LATITUDE 2 INFORMATION | LONGITUDE 1 INFORMATION | LONGITUDE 2 INFORMATION | POSITIONING TIME |
|---|---|---|---|---|---|
| GPS INFORMATION DB 1304 | 4807.038247 | N | 1131.324523 | E | 12:35:19.00 |
| | ... | ... | ... | ... | ... |
| | A901 | A902 | A903 | A904 | A905 |

| VEHICLE ADVANCING DIRECTION | VEHICLE TRAVELING SPEED | MEASURING TIME |
|---|---|---|
| 60 | 60 | 12:35:19.00 |
| ... | ... | ... |

VEHICLE ECU INFORMATION DB 1306

ROADSIDE UNIT INFORMATION PACKET A1100

| ROADSIDE UNIT ID | LATITUDE 1 INFORMATION | LATITUDE 2 INFORMATION | LONGITUDE 1 INFORMATION | LONGITUDE 2 INFORMATION | TRANSMITTING TIME | APPLICATION INFORMATION |
|---|---|---|---|---|---|---|
| 100 | 4807.038247 | N | 1131.324523 | E | 12:35:19.00 | DISABLED VEHICLE AHEAD |
| A1101 | A1102 | A1103 | A1104 | A1105 | A1106 | A1107 |

FIG. 11

| ID | LATITUDE 1 INFORMATION | LATITUDE 2 INFORMATION | LONGITUDE 1 INFORMATION | LONGITUDE 2 INFORMATION | RECEIVING TIME |
|---|---|---|---|---|---|
| 100 | 4807.038247 | N | 1131.324523 | E | 12:35:19.00 |
| ... | ... | ... | ... | ... | ... |

RECEPTION INFORMATION DB 1305

A1201  A1202  A1203  A1204  A1205  A1206

A12001
A1200n

IN-VEHICLE DEVICE AND VEHICLE

CROSS-REFERENCE TO RELATED APPLICATIONS

This application is a U.S. National Stage entry of PCT Application No: PCT/JP2017/003239 filed Jan. 30, 2017, which claims priority to Japanese Patent Application No. 2016-058929, filed Mar. 23, 2016, the contents of which are incorporated herein by reference.

TECHNICAL FIELD

The present invention relates to an in-vehicle device and a vehicle.

BACKGROUND ART

Conventionally, there is known a technique using a plurality of azimuth measuring means and a plurality of speed measuring means, in which an error of each measuring means is corrected to improve navigation accuracy (for example, PTL 1).

CITATION LIST

Patent Literature

PTL 1: JP 7-301541 A

SUMMARY OF INVENTION

Technical Problem

The prior art does not assume that an abnormality occurs in a positioning device.

Solution to Problem

According to a first aspect of the present invention, an in-vehicle device includes: an acquiring unit that acquires comparison information; and a detecting unit that detects an abnormality in a positioning device based on position information on a host vehicle output from the positioning device mounted in the host vehicle and the comparison information different from the position information.

Advantageous Effects of Invention

According to the present invention, an abnormality occurring in a positioning device can be detected.

BRIEF DESCRIPTION OF DRAWINGS

FIG. 5 is an explanatory diagram exemplifying the configuration of a vehicle information packet.
FIG. 6 is an explanatory diagram exemplifying the configuration of a global positioning system (GPS) information packet.
FIG. 8 is an explanatory diagram exemplifying the configuration of a GPS information database (DB).
FIG. 9 is an explanatory diagram exemplifying the configuration of a vehicle ECU information DB.
FIG. 10 is an explanatory diagram exemplifying the configuration of a roadside unit information packet.
FIG. 11 is an explanatory diagram exemplifying the configuration of a reception information DB.

DESCRIPTION OF EMBODIMENTS

First Embodiment

Figure 1:
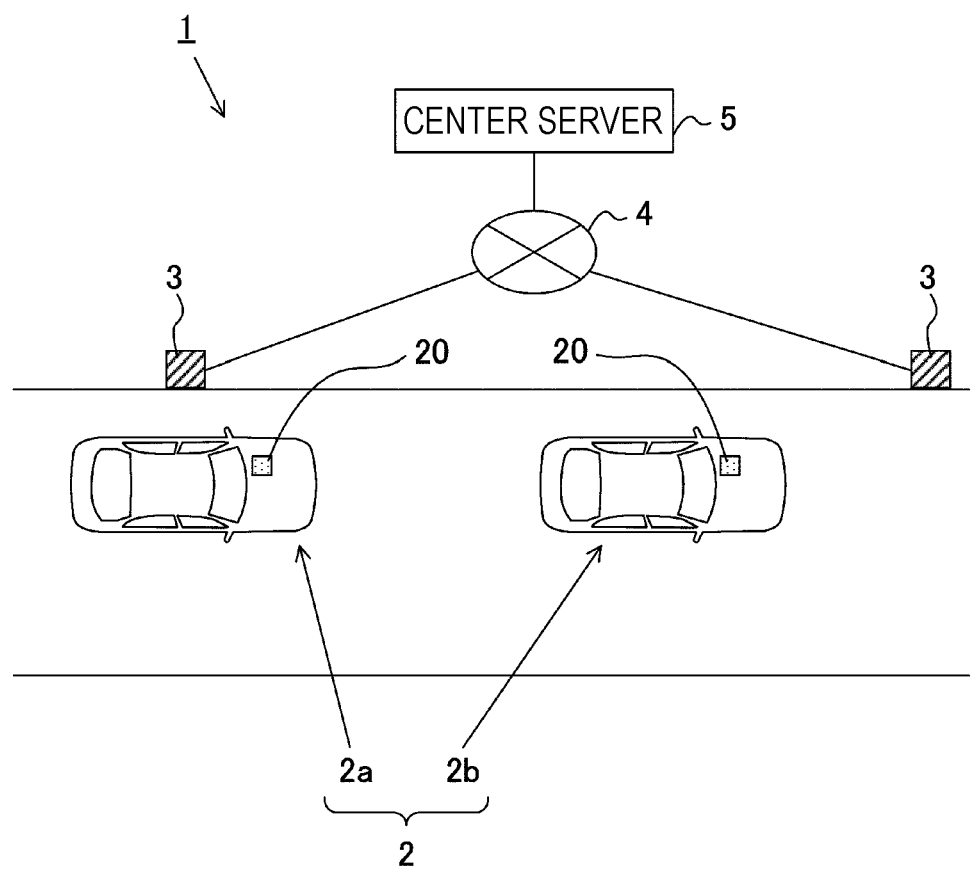
FIG. 1 is a configuration diagram of a vehicle control network system.

FIG. 1 is a configuration diagram of a vehicle control network system 1 having an in-vehicle device according to a first embodiment. The vehicle control network system 1 includes a plurality of vehicles 2, a plurality of roadside units 3, a network 4, and a center server 5.

Each of the plurality of vehicles 2 mounts an in-vehicle device 20. The roadside unit 3 is installed on a road side of a road on which the vehicle 2 travels. The roadside unit 3 is installed fixedly at a predetermined point. The plurality of roadside units 3 and the center server 5 are mutually connected by the network 4. The center server 5 performs data communication with the plurality of roadside units 3.

In the following description, one of the plurality of vehicles 2 is referred to as host vehicle 2a and vehicles 2 other than the host vehicle 2a are referred to as other vehicles 2b. The operation of the in-vehicle device 20 will be described by focusing on the host vehicle 2a.

Figure 2:
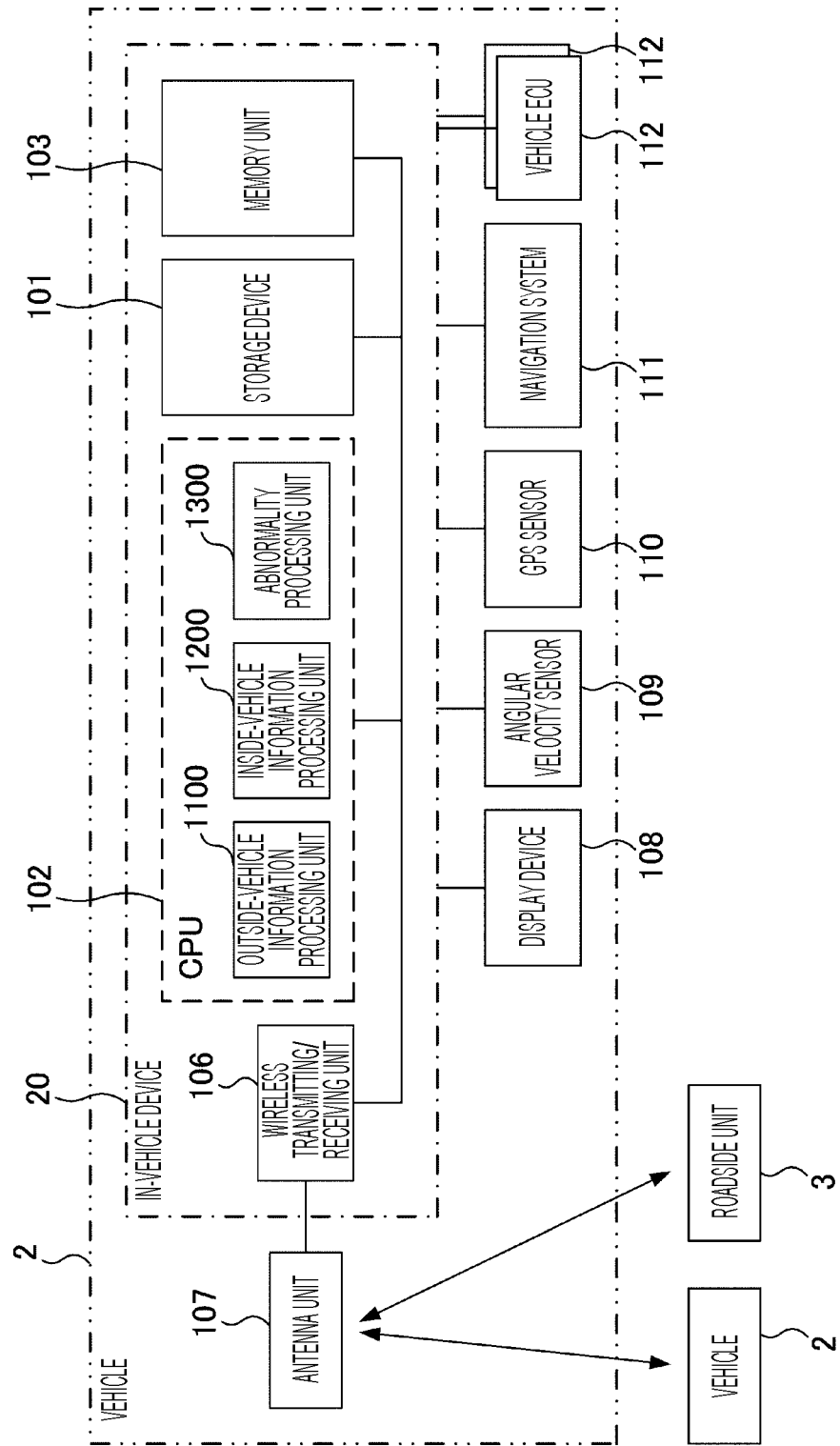
FIG. 2 is a block diagram exemplifying a hardware configuration of a vehicle and an in-vehicle device.

FIG. 2 is a block diagram exemplifying a hardware configuration of the vehicle 2 and the in-vehicle device 20. The vehicle 2 is provided with an antenna unit 107, a display device 108, an angular velocity sensor 109, a GPS sensor 110, a navigation system 111, and a plurality of vehicle ECUs 112.

The in-vehicle device 20 is connected with the antenna unit 107, the display device 108, the angular velocity sensor 109, the GPS sensor 110, the navigation system 111, and the plurality of vehicle ECUs 112.

The antenna unit 107 is connected to the in-vehicle device 20. The in-vehicle device 20 performs data communication with the roadside unit 3 and the in-vehicle device 20 mounted on the other vehicle 2 by wireless communication via the antenna unit 107.

The display device 108 is, for example, a liquid crystal monitor and displays various types of information to a driver. The angular velocity sensor 109 measures the angular velocity of the vehicle 2. The GPS sensor 110 is a positioning device that receives a signal from a satellite and measures the position of the vehicle 2. The navigation system 111 holds map information and provides a route guidance function to the driver. The plurality of vehicle ECUs 112 separately controls the accelerator, the brake, and the like of the vehicle 2.

The in-vehicle device 20 is provided with a storage device 101, a central processing unit (CPU) 102, a memory unit 103, and a wireless transmitting/receiving unit 106. The storage device 101 is an auxiliary storage device such as a hard disk drive (HDD) or a flash memory. The CPU 102 reads and executes a predetermined control program stored in, for example, the storage device 101 to control the in-vehicle device 20.

The memory unit 103 is a main storage device used by the CPU 102 when executing the control program. The wireless transmitting/receiving unit 106 performs data communication with the roadside unit 3 and the in-vehicle device 20 mounted on the other vehicle 2 by transmitting and receiving a wireless signal via the antenna unit 107.

The CPU 102 is functionally provided with an outside-vehicle information processing unit 1100, an inside-vehicle information processing unit 1200, and an abnormality processing unit 1300. That is, the outside-vehicle information processing unit 1100, the inside-vehicle information processing unit 1200, and the abnormality processing unit 1300 are implemented as software by the control program executed by the CPU 102. The outside-vehicle information processing unit 1100, the inside-vehicle information processing unit 1200, and the abnormality processing unit 1300 will be described later in detail.

Note that the outside-vehicle information processing unit 1100, the inside-vehicle information processing unit 1200, and the abnormality processing unit 1300 also can be constituted by, for example, equivalent electronic circuits.

Figure 3:
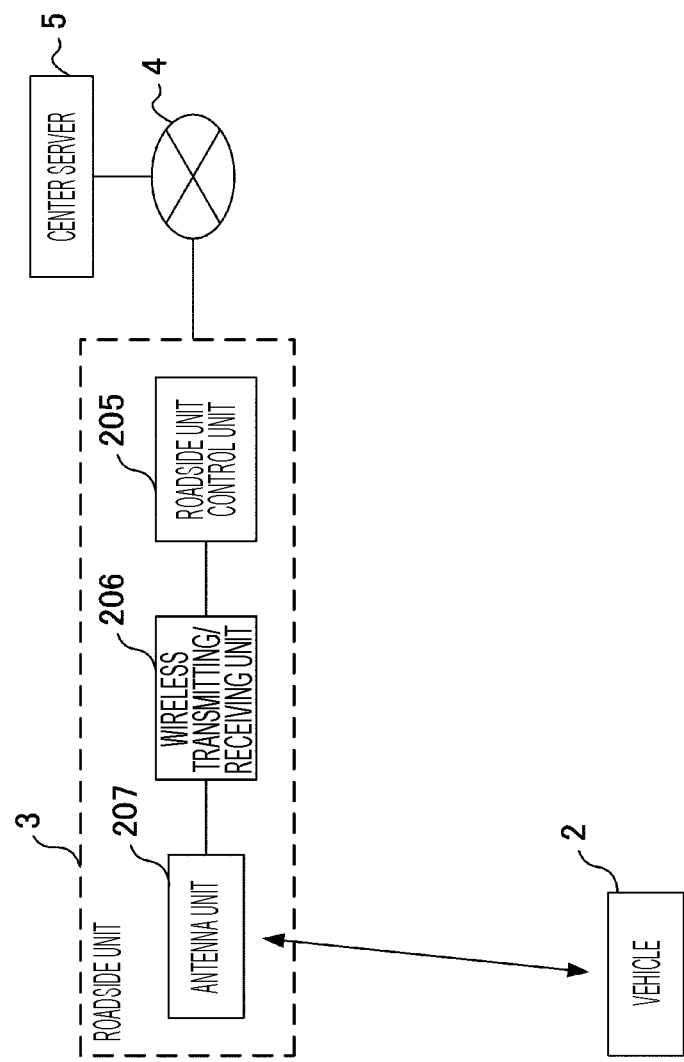
FIG. 3 is a block diagram exemplifying a hardware configuration of a roadside unit.

FIG. 3 is a block diagram exemplifying a hardware configuration of the roadside unit 3. The roadside unit 3 is provided with a roadside unit control unit 205, a wireless transmitting/receiving unit 206, and an antenna unit 207.

The wireless transmitting/receiving unit 206 performs data communication with the in-vehicle device 20 mounted on the vehicle 2 by transmitting and receiving a wireless signal via the antenna unit 207. The roadside unit control unit 205 controls the roadside unit 3. The roadside unit control unit 205 is connected to the network 4. The roadside unit control unit 205 performs data communication with the center server 5 via the network 4. The roadside unit control unit 205 transmits information transmitted from the center server 5 to the vehicle 2 and transmits information received from the vehicle 2 to the center server 5. In addition, the roadside unit control unit 205 transmits information other than the information transmitted from the center server 5 (for example, information saved in a storage medium (not illustrated) included in the roadside unit 3) to the vehicle 2.

Figure 4:
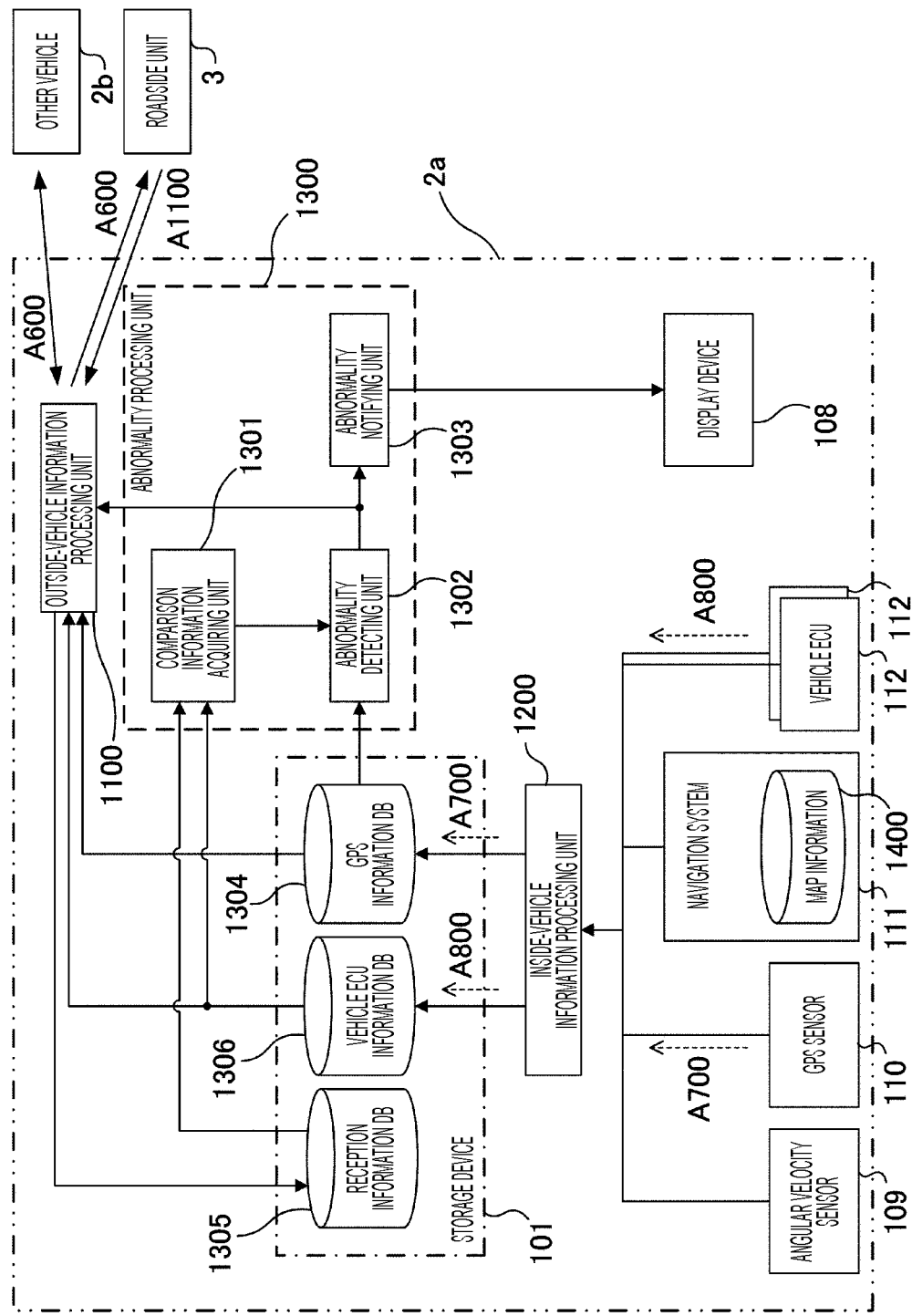
FIG. 4 is a block diagram exemplifying a functional configuration of an in-vehicle device.

FIG. 4 is a block diagram exemplifying a functional configuration of the in-vehicle device 20. The storage device 101 has a GPS information DB 1304, a reception information DB 1305, and a vehicle ECU information DB 1306. The configuration of each of these databases will be described in detail later.

The outside-vehicle information processing unit 1100 transmits and receives information to and from the outside of the host vehicle 2*a*. For example, the outside-vehicle information processing unit 1100 transmits a vehicle information packet A600 described later to the other vehicle 2*b* and the roadside unit 3. The outside-vehicle information processing unit 1100 receives the vehicle information packet A600 described later from the other vehicle 2*b*. The outside-vehicle information processing unit 1100 receives a roadside unit information packet A1100 described later from the roadside unit 3. The outside-vehicle information processing unit 1100 saves the vehicle information packet A600 and the roadside unit information packet A1100 received from the outside in the reception information DB 1305.

The inside-vehicle information processing unit 1200 receives information output from the angular velocity sensor 109, the GPS sensor 110, the navigation system 111, and the vehicle ECUs 112. For example, the GPS sensor 110 outputs a GPS information packet A700 described later to the inside-vehicle information processing unit 1200. In addition, the vehicle ECU 112 outputs an ECU information packet A800 described later to the inside-vehicle information processing unit 1200. Here, the ECU stands for an electronic control unit and has a function of processing information.

The navigation system 111 has map information 1400. The navigation system 111 outputs the map information 1400 to the inside-vehicle information processing unit 1200. The inside-vehicle information processing unit 1200 saves the received GPS information packet A700 in the GPS information DB 1304. The inside-vehicle information processing unit 1200 saves the received ECU information packet A800 in the vehicle ECU information DB 1306.

The abnormality processing unit 1300 has a comparison information acquiring unit 1301, an abnormality detecting unit 1302, and an abnormality notifying unit 1303. The comparison information acquiring unit 1301 acquires comparison information described later from the vehicle ECU information DB 1306 and the reception information DB 1305.

The abnormality detecting unit 1302 detects an abnormality in the GPS sensor 110 based on position information on the host vehicle 2*a* saved in the GPS information DB 1304 and the comparison information acquired by the comparison information acquiring unit 1301. When an abnormality in the GPS sensor 110 is detected by the abnormality detecting unit 1302, the abnormality notifying unit 1303 notifies the driver and the outside of the host vehicle 2*a* that an abnormality has been detected.

FIG. 5 is an explanatory diagram exemplifying the configuration of the vehicle information packet A600. The vehicle information packet A600 includes a vehicle ID A601, latitude 1 information A602, latitude 2 information A603, longitude 1 information A604, longitude 2 information A605, positioning time A606, a vehicle advancing direction A607, and a vehicle traveling speed A608.

The vehicle ID A601 is a number assigned to each vehicle 2 so as not to be redundant. The latitude 1 information A602 is a latitude value representing the current position of the vehicle 2. The latitude 2 information A603 is information representing whether the value of the latitude 1 information A602 indicates north latitude (N) or south latitude (S).

The longitude 1 information A604 is a longitude value representing the current position of the vehicle 2. The longitude 2 information A605 is information representing whether the value of the longitude 1 information A604 indicates east longitude (E) or west longitude (W). The positioning time A606 is information representing the time (time of day) at which the values of the latitude 1 information A602, the latitude 2 information A603, the longitude 1 information A604, and the longitude 2 information A605 were acquired through positioning.

The vehicle advancing direction A607 is information representing an advancing direction of the vehicle 2 at the positioning time A606. The vehicle advancing direction A607 is expressed by an angle of 0 to 360 degrees, for example, where a predetermined direction (for example, a magnetic north direction) is designated as 0 degrees. The vehicle traveling speed A608 is information representing a traveling speed of the vehicle 2 at the positioning time A606. The vehicle traveling speed A608 is expressed, for example, as a numerical value in kilometers per hour.

The outside-vehicle information processing unit 1100 acquires a positioning result and vehicle information (speed, advancing direction, and the like) at a specific time from the vehicle ECU information DB 1306 and the GPS information DB 1304 to create the vehicle information packet A600. The outside-vehicle information processing unit 1100 transmits the created vehicle information packet A600 to the other vehicle 2*b* and the roadside unit 3 located in the vicinity of the host vehicle 2*a* (for example, within a range of several tens of meters in radius around the host vehicle 2*a*).

FIG. 6 is an explanatory diagram exemplifying the configuration of the GPS information packet A700. The GPS information packet A700 includes latitude 1 information A701, latitude 2 information A702, longitude 1 information A703, longitude 2 information A704, and positioning time A705.

The latitude 1 information A701 is a latitude value representing the current position of the vehicle 2. The latitude 2 information A702 is information representing whether the value of the latitude 1 information A701 indicates north latitude (N) or south latitude (S). The longitude 1 information A703 is a longitude value representing the current position of the vehicle 2. The longitude 2 information A704 is information representing whether the value of the longitude 1 information A703 indicates east longitude (E) or west longitude (W).

The positioning time A705 is information representing the time (time of day) at which the values of the latitude 1 information A701, the latitude 2 information A702, the longitude 1 information A703, and the longitude 2 information A704 were acquired through positioning.

The GPS sensor 110 receives a signal from a satellite and measures the position of the vehicle 2. The GPS sensor 110 transmits a positioning result to the inside-vehicle information processing unit 1200 in the form of the GPS information packet A700. The inside-vehicle information processing unit 1200 saves each piece of information included in the received GPS information packet A700 in the GPS information DB 1304 described later.

Figure 7:
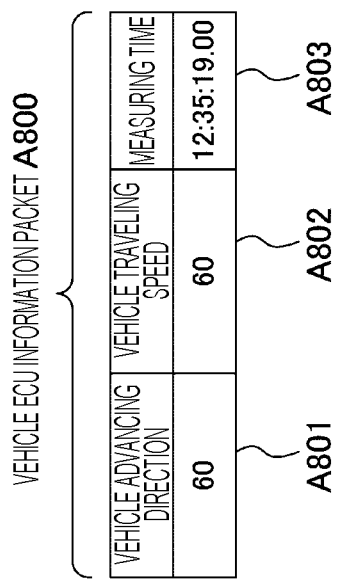
FIG. 7 is an explanatory diagram exemplifying the configuration of a vehicle electronic control unit (ECU) information packet.

FIG. 7 is an explanatory diagram exemplifying the configuration of the vehicle ECU information packet A800. The vehicle ECU information packet A800 includes a vehicle advancing direction A801, a vehicle traveling speed A802, and measuring time A803.

The vehicle advancing direction A801 is information representing an advancing direction of the vehicle 2 at the measuring time A803. The vehicle advancing direction A801 is expressed by an angle of 0 to 360 degrees, for example, where a predetermined direction (for example, a magnetic north direction) is designated as 0 degrees. The vehicle traveling speed A802 is information representing a traveling speed of the vehicle 2 at the measuring time A803. The vehicle traveling speed A802 is expressed, for example, as a numerical value in kilometers per hour. The measuring time A803 is information representing the time (time of day) at which the values of the vehicle advancing direction A801 and the vehicle traveling speed A802 were acquired by the vehicle ECUs 112.

The vehicle ECUs 112 create the vehicle ECU information packet A800 based on control information on the vehicle 2. The vehicle ECUs 112 transmit the created vehicle ECU information packet A800 to the inside-vehicle information processing unit 1200. The inside-vehicle information processing unit 1200 saves each piece of information included in the received vehicle ECU information packet A800 in the vehicle ECU information DB 1306 described later.

For example, the vehicle ECU 112 has a triaxial acceleration sensor. The vehicle ECU 112 estimates the vehicle advancing direction A801 based on the integration between the current acceleration of the vehicle 2 detected by the triaxial acceleration sensor and the past acceleration history of the vehicle 2 detected in the past by the triaxial acceleration sensor. Alternatively, the current vehicle advancing direction A801 may be estimated using a moving average of the acceleration history, or the like. As another example, the vehicle ECU 112 has a GPS sensor different from the GPS sensor 110. The vehicle ECU 112 specifies the vehicle advancing direction A801 based on a difference between the current position of the vehicle 2 detected by this GPS sensor and a past position of the vehicle 2 detected in the past by this GPS sensor.

Note that the information included in the vehicle ECU information packet A800 may not be the information itself exemplified in FIG. 7 but may be information that can generate the information exemplified in FIG. 7. For example, information such as an accelerator opening degree, a brake pressure, and a steering angle may be employed. In this case, the inside-vehicle information processing unit 1200 makes various calculations on the information included in the vehicle ECU information packet A800, thereby generating the vehicle advancing direction A801 and the vehicle traveling speed A802 exemplified in FIG. 7.

FIG. 8 is an explanatory diagram exemplifying the configuration of the GPS information DB 1304. The GPS information DB 1304 stores a plurality of pieces of GPS information A9001 to A900*n*. Each piece of the GPS information A9001 to A900*n* includes latitude 1 information A901, latitude 2 information A902, longitude 1 information A903, longitude 2 information A904, and positioning time A905.

The contents of the latitude 1 information A901, the latitude 2 information A902, the longitude 1 information A903, the longitude 2 information A904, and the positioning time A905 are the same as those of the latitude 1 information A701, the latitude 2 information A702, the longitude 1 information A703, the longitude 2 information A704, and the positioning time A705 described with reference to FIG. 6, respectively, and thus the description thereof will be omitted.

Every time the inside-vehicle information processing unit 1200 receives the GPS information packet A700, the inside-vehicle information processing unit 1200 writes each piece of information included in the received GPS information packet A700 additionally to the GPS information DB 1304. That is, each piece of information included in the GPS information packet A700 is saved in the GPS information DB 1304 in chronological order.

FIG. 9 is an explanatory diagram exemplifying the configuration of the vehicle ECU information DB 1306. The vehicle ECU information DB 1306 stores a plurality of pieces of ECU information A10001 to A1000*n*. Each piece of the ECU information A10001 to A1000*n* includes a vehicle advancing direction A1001, a vehicle traveling speed A1002, and measuring time A1003.

The contents of the vehicle advancing direction A1001, the vehicle traveling speed A1002, and the measuring time A1003 are the same as those of the vehicle advancing direction A801, the vehicle traveling speed A802, and the measuring time A803 described with reference to FIG. 7, respectively, and thus the description thereof will be omitted.

Every time the inside-vehicle information processing unit 1200 receives the vehicle ECU information packet A800, the inside-vehicle information processing unit 1200 writes each piece of information included in the received vehicle ECU information packet A800 additionally to the vehicle ECU information DB 1306. That is, each piece of information included in the vehicle ECU information packet A800 is saved in the vehicle ECU information DB 1306 in chronological order.

FIG. 10 is an explanatory diagram exemplifying the configuration of the roadside unit information packet A1100. The roadside unit information packet A1100 includes a roadside unit ID A1101, latitude 1 information A1102, latitude 2 information A1103, longitude 1 information A1104, longitude 2 information A1105, transmitting time A1106, and application information A1107.

The roadside unit ID A1101 is a number assigned to each roadside unit 3 so as not to be redundant. The latitude 1 information A1102 is a latitude value representing a position where the roadside unit 3 is installed. The latitude 2 information A1103 is information representing whether the value of the latitude 1 information A1102 indicates north latitude (N) or south latitude (S).

The longitude 1 information A1104 is a longitude value representing a position where the roadside unit 3 is installed. The longitude 2 information A1105 is information representing whether the value of the longitude 1 information A1104 indicates east longitude (E) or west longitude (W). The transmitting time A1106 is information representing the time (time of day) at which this roadside unit information packet A1100 was transmitted.

The application information A1107 is other information provided to the vehicle 2 by this roadside unit information packet A1100. The application information A1107 is, for example, information for notifying the driver that a traffic accident has happened nearby.

The roadside unit 3 creates the roadside unit information packet A1100 when the vehicle 2 is located in the vicinity of the roadside unit 3 (for example, within a range of several tens of meters in radius around the roadside unit 3). For example, the roadside unit 3 compares the position information on the vehicle 2 included in the vehicle information packet A600, which has been received from the vehicle 2, with the position where the roadside unit 3 is installed and, when the vehicle 2 is located in the vicinity of the roadside unit 3, creates the roadside unit information packet A1100.

The roadside unit 3 creates the roadside unit information packet A1100 including information received from the center server 5 as the application information A1107. The roadside unit 3 transmits the created roadside unit information packet A1100 to the vehicle 2 located in the vicinity. The inside-vehicle information processing unit 1200 saves each piece of information included in the received roadside unit information packet A1100 in the reception information DB 1305 described later.

FIG. 11 is an explanatory diagram exemplifying the configuration of the reception information DB 1305. The reception information DB 1305 stores a plurality of pieces of reception information A12001 to A1200n. Each piece of the reception information A12001 to A1200n includes an ID A1201, latitude 1 information A1202, latitude 2 information A1203, longitude 1 information A1204, longitude 2 information A1205, and receiving time A1206.

The ID A1201, the latitude 1 information A1202, the latitude 2 information A1203, the longitude 1 information A1204, and the longitude 2 information A1205 are the same as the vehicle ID A601, the latitude 1 information A602, the latitude 2 information A603, the longitude 1 information A604, and the longitude 2 information A605 described with reference to FIG. 5, or the roadside unit ID A1101, the latitude 1 information A1102, the latitude 2 information A1103, the longitude 1 information A1104, and the longitude 2 information A1105 described with reference to FIG. 10, respectively, and thus the description thereof will be omitted.

Every time the outside-vehicle information processing unit 1100 receives the vehicle information packet A600 or the roadside unit information packet A1100, the outside-vehicle information processing unit 1100 writes each piece of information included in the received packet additionally to the reception information DB 1305. That is, each piece of information included in the vehicle information packet A600 or the roadside unit information packet A1100 is saved in the reception information DB 1305 in chronological order. The receiving time A1206 is information representing the time (time of day) at which the vehicle information packet A600 or the roadside unit information packet A1100 was received.

Note that information representing the time (time of day) at which the vehicle information packet A600 or the roadside unit information packet A1100 was transmitted may be saved in the reception information DB 1305 instead of the receiving time A1206. When such a configuration is employed, the transmitting time A1106 included in the roadside unit information packet A1100 may be used as it is in the case of the roadside unit information packet A1100. In addition, in the case of the vehicle information packet A600, it is necessary to add, to the vehicle information packet A600, information indicating the time of day when the vehicle information packet A600 was transmitted.

Figure 12:
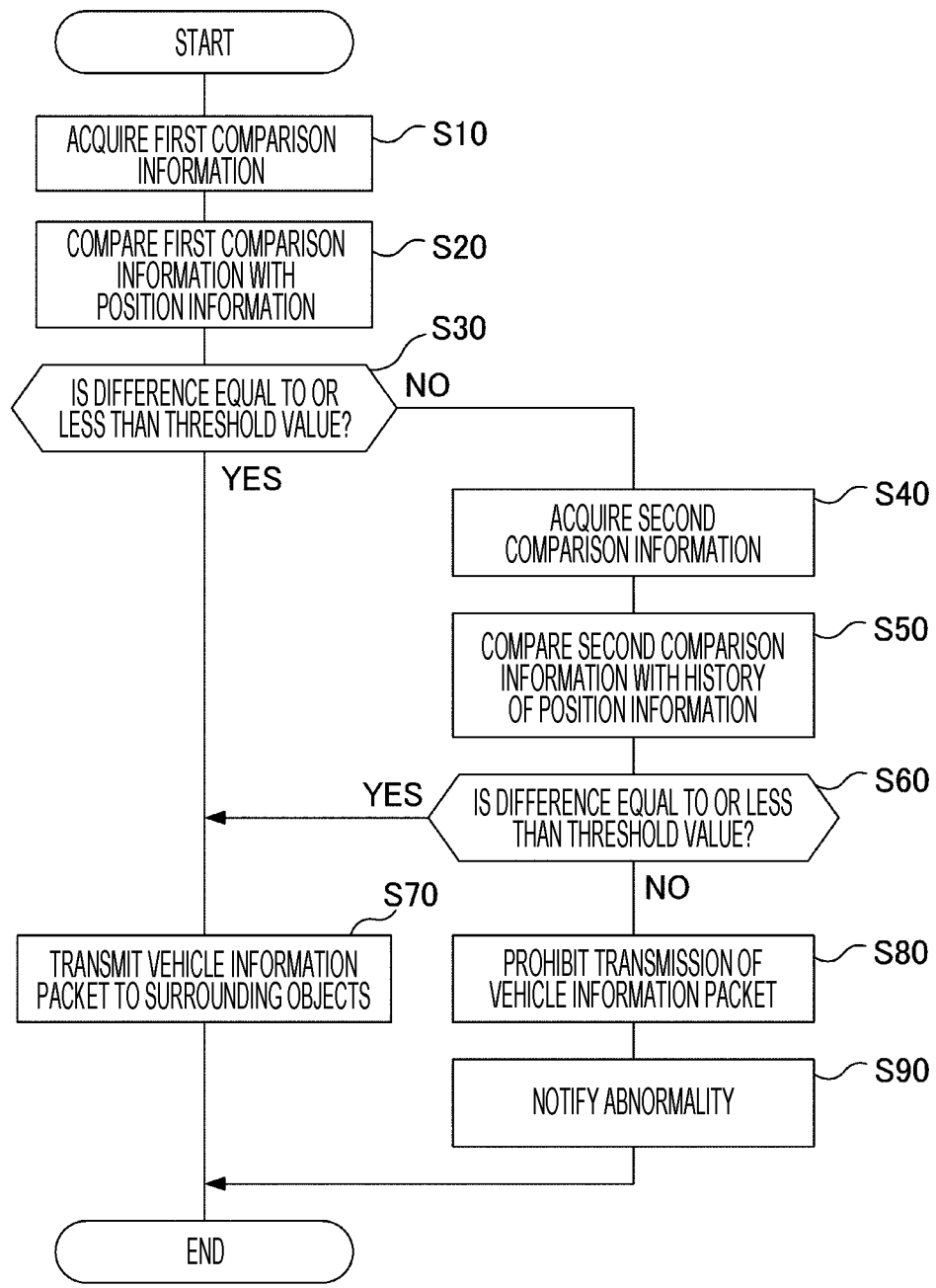
FIG. 12 is a flowchart of an abnormality detection process executed by an abnormality processing unit.

FIG. 12 is a flowchart of an abnormality detection process executed by the abnormality processing unit 1300. In step S10, the comparison information acquiring unit 1301 acquires first comparison information from the reception information DB 1305. The first comparison information acquired here is the latest (most up-to-date) reception information A1200n in the reception information DB 1305. That is, the first comparison information is information indicating the position of the other vehicle 2b or the roadside unit 3 that was located close to the host vehicle 2a most recently.

In step S20, the abnormality detecting unit 1302 compares the first comparison information with the position information. The position information compared with the first comparison information here is the latest (most up-to-date) GPS information A900n in the GPS information DB 1304.

In step S30, the abnormality detecting unit 1302 determines whether or not the difference between the first comparison information and the position information (that is, a distance between the two positions) compared in step S20 is equal to or less than a predetermined threshold value. In different words, the abnormality detecting unit 1302 determines whether the position indicated by the first comparison information and the position indicated by the position information are separated by a certain distance or more in consideration of an error due to the GPS accuracy and the like.

As described earlier, the first comparison information is information indicating the position of the other vehicle 2b or the roadside unit 3 that was located close to the host vehicle 2a most recently. In different words, the first comparison information is information indicating the position of the other vehicle 2b or the roadside unit 3 indicated by the vehicle information packet A600 of the other vehicle 2b or the roadside unit information packet A1100 received most recently by the host vehicle 2a. Therefore, as long as an abnormality does not occur, the difference between the first comparison information and the position information compared in step S20 (that is, the distance between the two positions) does not greatly exceed a distance obtained by adding together a communicable distance between the host vehicle 2*a* and the other vehicle 2*b* or the roadside unit 3 and an error due to the GPS accuracy and the like. The threshold value used in step S30 is defined in consideration of this communicable distance, the GPS accuracy, and the like. For example, if the GPS sensor 110 independently performs positioning, the threshold value is set to about 300 meters by adding an error of 50 meters to a communicable distance of 250 meters. Meanwhile, if the GPS sensor 110 performs positioning by making correction with differential global positioning system (D-GPS) or the like, the threshold value is set to about 260 meters by adding an error of 10 meters to a communicable distance of 250 meters. If the GPS sensor 110 performs highly accurate positioning using a quasi-zenith satellite, the threshold value is set to about 250.3 meters by adding an error of 30 centimeters to a communicable distance of 250 meters. When the communicable distance falls below the above-mentioned threshold value, a threshold value to the extent slightly exceeding the communicable distance is set instead of the above-mentioned threshold value. Note that the threshold value may be changed dynamically according to the number and type of satellites used by the GPS sensor 110 for positioning.

In step S30, when the difference between the first comparison information and the position information is equal to or less than the predetermined threshold value, the abnormality detecting unit 1302 advances the process to step S70. In step S70, the outside-vehicle information processing unit 1100 transmits the vehicle information packet A600 indicating the position of the host vehicle 2*a* to the surrounding other vehicle 2*b* and roadside unit 3.

On the other hand, when the difference between the first comparison information and the position information exceeds the predetermined threshold value in step S30, the abnormality detecting unit 1302 advances the process to step S40. In step S40, the comparison information acquiring unit 1301 acquires second comparison information from the vehicle ECU information DB 1306. The second comparison information acquired here includes the latest M (most up-to-date M) pieces of ECU information among the plurality of pieces of ECU information A10001 to A1000*n* in the vehicle ECU information DB 1306. Here, M is an integer equal to or larger than one. That is, the second comparison information is information indicating the histories of the advancing direction and vehicle speed of the host vehicle 2*a*. For example, it is assumed that the positioning of the GPS sensor 110 is performed at intervals of about one second and comparison of the position information is desired to be performed at intervals of about 500 meters. Supposing that the average speed per hour of the vehicle 2 is 60 kilometers an hour, the time to travel 500 meters is given as 30 seconds and accordingly M can be set to a value of about (30 seconds/one second)=30.

In step S50, the abnormality detecting unit 1302 compares the second comparison information with the history of the position information. The history of the position information compared with the second comparison information here is the latest N (most up-to-date N) pieces of GPS information among the plurality of pieces of GPS information A9001 to A900*n* in the GPS information DB 1304.

The abnormality detecting unit 1302 estimates the past advancing direction and vehicle speed of the host vehicle 2*a* from these pieces of information in the GPS information DB 1304. The past advancing direction can be estimated, for example, by examining a straight line joining two points. The past vehicle speed can be estimated, for example, by dividing a distance between two points by a difference in positioning time. Note that the method of estimating the past advancing direction and vehicle speed may be different from these methods.

The abnormality detecting unit 1302 compares the past advancing direction and vehicle speed thus estimated with the histories of the advancing direction and vehicle speed of the host vehicle 2*a* included in the second comparison information. For example, a method of comparing the histories of the advancing direction and vehicle speed using a moving average, or the like is used as the method of comparison. Note that only one of the advancing direction and the vehicle speed may be compared.

In step S60, the abnormality detecting unit 1302 determines whether or not a difference between the second comparison information and the history of the position information compared in step S50 is equal to or less than a predetermined threshold value. When this difference is equal to or less than the predetermined threshold value, the abnormality detecting unit 1302 advances the process to step S70. In step S70, the outside-vehicle information processing unit 1100 transmits the vehicle information packet A600 indicating the position of the host vehicle 2*a* to the surrounding other vehicle 2*b* and roadside unit 3.

On the other hand, when the difference between the second comparison information and the history of the position information exceeds the predetermined threshold value in step S60, the abnormality detecting unit 1302 advances the process to step S80. In step S80, the abnormality detecting unit 1302 prohibits the transmission of the vehicle information packet A600 by the outside-vehicle information processing unit 1100. The outside-vehicle information processing unit 1100 prohibited from transmitting the vehicle information packet A600 stops transmitting the vehicle information packet A600. In step S90, the abnormality notifying unit 1303 displays a predetermined message on the display device 108, thereby notifying the driver of the occurrence of an abnormality.

Figure 13:
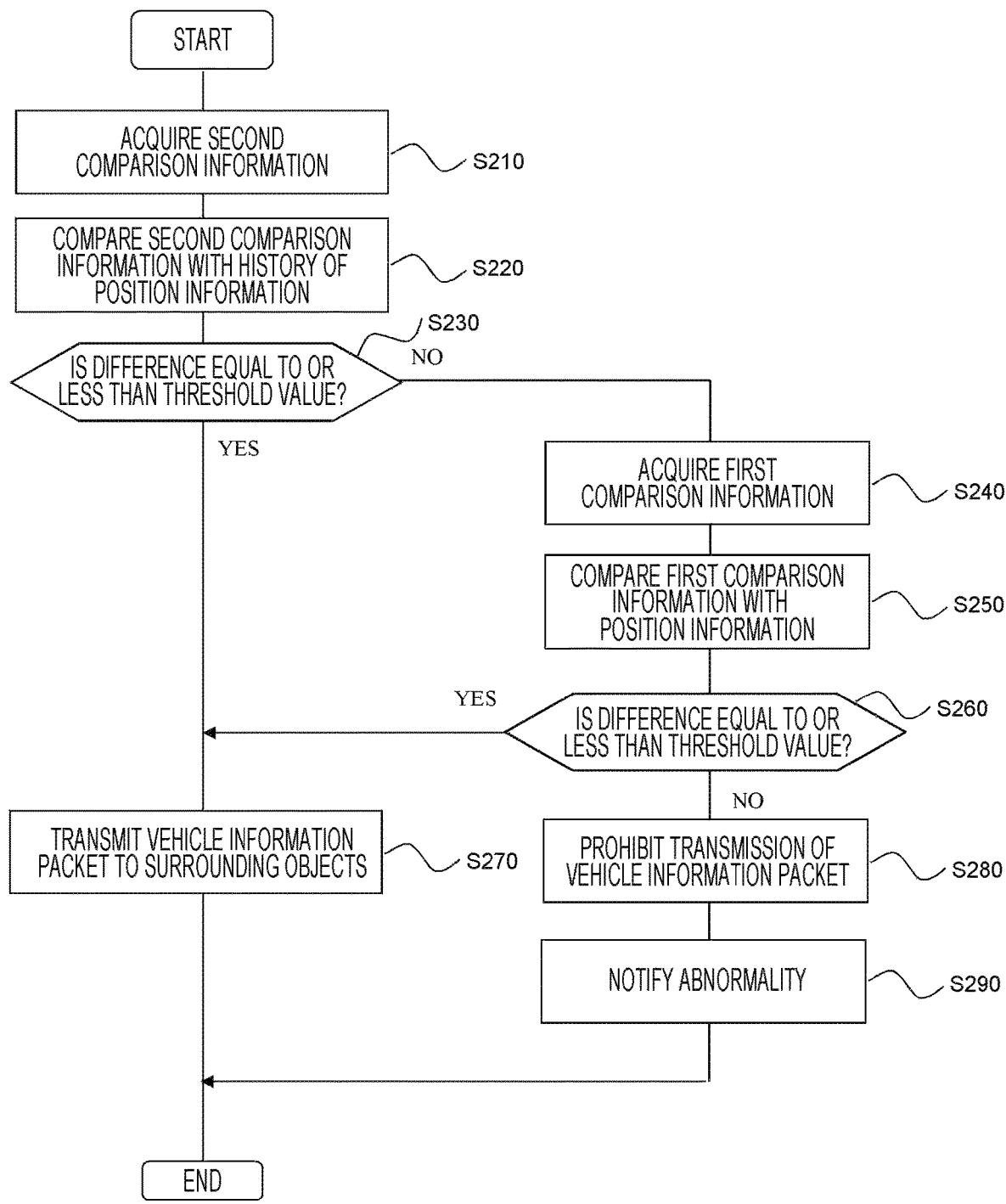
FIG. 13 is a flowchart of an abnormality detection process with different processing procedures executed by the abnormality processing unit.

FIG. 13 is a flowchart of an abnormality detection process executed by the abnormality processing unit 1300. In FIG. 12, the second comparison information and the history of the position information is compared after the first comparison information and the position information is compared. However, FIG. 13 illustrates a flowchart in the case of carrying out the comparison between the first comparison information and the position information after comparing the second comparison information and the history of the position information.

In step S210, the comparison information acquiring unit 1301 acquires the second comparison information from the vehicle ECU information DB 1306. The second comparison information acquired here includes the latest M (most up-to-date M) pieces of ECU information among the plurality of pieces of ECU information A10001 to A1000*n* in the vehicle ECU information DB 1306.

In step S220, the abnormality detecting unit 1302 compares the second comparison information with the history of the position information. The history of the position information compared with the second comparison information here is the latest N (most up-to-date N) pieces of GPS information among the plurality of pieces of GPS information A9001 to A900*n* in the GPS information DB 1304.

The abnormality detecting unit 1302 estimates the past advancing direction and vehicle speed of the host vehicle 2*a* from these pieces of information in the GPS information DB 1304. The past advancing direction can be estimated, for example, by examining a straight line joining two points. The past vehicle speed can be estimated, for example, by dividing a distance between two points by a difference in positioning time. Note that the method of estimating the past advancing direction and vehicle speed may be different from these methods.

The abnormality detecting unit 1302 compares the past advancing direction and vehicle speed thus estimated with the histories of the advancing direction and vehicle speed of the host vehicle 2a included in the second comparison information.

In step S230, the abnormality detecting unit 1302 determines whether or not a difference between the second comparison information and the history of the position information compared in step S220 is equal to or less than a predetermined threshold value. When this difference is equal to or less than the predetermined threshold value, the abnormality detecting unit 1302 advances the process to step S270. In step S270, the outside-vehicle information processing unit 1100 transmits the vehicle information packet A600 indicating the position of the host vehicle 2a to the surrounding other vehicle 2b and roadside unit 3.

When the difference between the second comparison information and the history of the position information exceeds the predetermined threshold value in step S230, the abnormality detecting unit 1302 advances the process to step S240. In step S240, the comparison information acquiring unit 1301 acquires the first comparison information from the reception information DB 1305. The first comparison information acquired here is the latest (most up-to-date) reception information A1200$n$ in the reception information DB 1305. That is, the first comparison information is information indicating the position of the other vehicle 2b or the roadside unit 3 that was located close to the host vehicle 2a most recently.

In step S250, the abnormality detecting unit 1302 compares the first comparison information with the position information. The position information compared with the first comparison information here is the latest (most up-to-date) GPS information A900$n$ in the GPS information DB 1304.

In step S260, the abnormality detecting unit 1302 determines whether or not the difference between the first comparison information and the position information (that is, a distance between the two positions) compared in step S240 is equal to or less than a predetermined threshold value. In different words, the abnormality detecting unit 1302 determines whether the position indicated by the first comparison information and the position indicated by the position information are separated by a certain distance or more in consideration of an error due to the GPS accuracy and the like.

On the other hand, when the difference between the first comparison information and the history of the position information exceeds the predetermined threshold value in step S260, the abnormality detecting unit 1302 advances the process to step S280. In step S280, the abnormality detecting unit 1302 prohibits the transmission of the vehicle information packet A600 by the outside-vehicle information processing unit 1100. The outside-vehicle information processing unit 1100 prohibited from transmitting the vehicle information packet A600 stops transmitting the vehicle information packet A600. In step S290, the abnormality notifying unit 1303 displays a predetermined message on the display device 108, thereby notifying the driver of the occurrence of an abnormality.

By receiving a signal from a satellite, the GPS sensor 110 detects information indicating the position of the vehicle 2 (the latitude 1 information A901, the latitude 2 information A902, the longitude 1 information A903, and the longitude 2 information A904) and information indicating the time at which the positioning was performed (the positioning time A905). When an abnormality occurs in the GPS sensor 110, at least one of the former position information and the latter time information results in erroneous information. In both cases where the former position information is not normal and where the latter time information is not normal, the past advancing direction and vehicle speed estimated by the abnormality detecting unit 1302 based on the GPS information DB 1304 result in a traveling direction and a vehicle speed greatly different from the actual ones. In other words, even when only the position information has an abnormal content or even when only the time information has an abnormal content, the abnormality detecting unit 1302 can detect an abnormality occurring in the GPS sensor 110.

Note that an abnormality occurring in the positioning time A905 may be detected by a method different from the method for the position information. For example, the exact time may be acquired from another information source beforehand such that, in step S20, the history thereof is compared with the history of the positioning time A905 and, when a deviation of a certain level or more is found in step S30, the GPS sensor 110 is judged to have an abnormality. As the another information source mentioned here, another GPS sensor prepared separately from the GPS sensor 110, a timer module using a quartz oscillator or the like, a timer module containing therein a radio wave clock, or the like can be used.

According to the above-described first embodiment, the following action effects can be obtained.

(1) The comparison information acquiring unit 1301 acquires the first comparison information and the second comparison information. The abnormality detecting unit 1302 detects an abnormality in the GPS sensor 110 based on the position information on the host vehicle 2a output from the GPS sensor 110 mounted on the host vehicle 2a and the first comparison information and the second comparison information different from the position information on the host vehicle 2a. By configuring in such a manner, it is possible to detect an abnormality occurring in the GPS sensor 110.

(2) The comparison information acquiring unit 1301 acquires the vehicle information output from the vehicle ECUs 112 of the host vehicle 2a as the second comparison information. By configuring in such a manner, an abnormality in the GPS sensor 110 can be detected when the output of the GPS sensor 110 is inconsistent with the output of the vehicle ECUs 112.

(3) The comparison information acquiring unit 1301 acquires the vehicle information relating to the advancing direction and speed of the host vehicle 2a. By configuring in such a manner, an abnormality in the GPS sensor 110 can be detected when the output of the GPS sensor 110 is inconsistent with the advancing direction and speed of the host vehicle 2a.

(4) The abnormality detecting unit 1302 compares the speed and advancing direction of the host vehicle 2a based on the vehicle information with the speed and advancing direction of the host vehicle 2a based on the plurality of pieces of position information, to detect an abnormality in the GPS sensor 110. By configuring in such a manner, an abnormality in the GPS sensor 110 can be detected when the output of the GPS sensor 110 is inconsistent with the advancing direction and speed of the host vehicle 2a.

(5) The comparison information acquiring unit 1301 acquires other position information different from the position information acquired from the GPS sensor 110 from the outside of the host vehicle 2a as the first comparison information. By configuring in such a manner, an abnormality in the GPS sensor 110 can be detected when the output of the GPS sensor 110 is inconsistent with the output of the GPS sensor 110 of the other vehicle 2b and when the output of the GPS sensor 110 is inconsistent with the output of the roadside unit 3.

(6) The comparison information acquiring unit 1301 acquires other position information representing the position of the other vehicle 2b located within a predetermined range from the host vehicle 2a as the first comparison information. By configuring in such a manner, an abnormality in the GPS sensor 110 can be detected when a difference between the output of the GPS sensor 110 and the output of the GPS sensor 110 of the other vehicle 2b is far away from the communicable distance with the other vehicle 2b.

(7) The comparison information acquiring unit 1301 acquires other position information representing the position of the roadside unit 3 fixed at a predetermined point as the first comparison information when a distance between the roadside unit 3 and the host vehicle 2a is equal to or less than a predetermined distance. By configuring in such a manner, an abnormality in the GPS sensor 110 can be detected when a difference between the output of the GPS sensor 110 and the output of the roadside unit 3 is far away from the communicable distance with the roadside unit 3.

(8) The outside-vehicle information processing unit 1100 transmits the vehicle information packet A600 including the position information acquired from the GPS sensor 110 to the outside of the host vehicle 2a. When an abnormality in the GPS sensor 110 is detected by the abnormality detecting unit 1302, the outside-vehicle information processing unit 1100 stops transmitting the vehicle information packet A600 including the position information. By configuring in such a manner, it is possible to prevent the vehicle information packet A600 including incorrect information from having an adverse influence on the other vehicle 2b.

The following modifications are also within the scope of the present invention and it is also possible to combine one or a plurality of the modifications with the above-described embodiment.

(First Modification)

The abnormality notifying unit 1303 may notify not only the driver but also the outside of the host vehicle 2a of an abnormality in the GPS sensor 110. For example, when an abnormality is detected, the abnormality notifying unit 1303 may transmit a packet indicating that an abnormality has occurred in the GPS sensor 110 of the host vehicle 2a to the other vehicle 2b and the roadside unit 3.

(Second Modification)

The abnormality detecting unit 1302 may detect an abnormality in the GPS sensor 110 using only one of the first comparison information and the second comparison information. For example, in the process in FIG. 12, if steps S10 to S30 are omitted such that the process is started from step S40, it is possible to detect an abnormality in the GPS sensor 110 using only the second comparison information. Alternatively, in the process in FIG. 12, if steps S40 to S60 are omitted such that the process proceeds to step S80 when the negative determination is made in step 30, it is possible to detect an abnormality in the GPS sensor 110 using only the first comparison information.

(Third Modification)

In the above-described embodiment, the speed and advancing direction of the host vehicle 2a are estimated from the contents of the GPS information DB 1304 and an abnormality in the GPS sensor 110 is detected by comparing the estimation result with the second comparison information. Conversely, the position of the host vehicle 2a may be estimated from the second comparison information to compare the estimation result with the contents of the GPS information DB 1304, such that an abnormality in the GPS sensor 110 is detected. For example, by adding a distance traveled by the host vehicle 2a from a predetermined starting point to position information indicating the starting point, the position of the host vehicle 2a can be estimated. The travel distance of the host vehicle 2a can be acquired, for example, from a vehicle speed pulse based on the rotation speed of the wheel of the host vehicle 2a. When the travel distance is added, the moving direction of the host vehicle 2a may be worked out from the steering angle, the angular velocity, and the like of the host vehicle 2a such that the travel distance is added in consideration of this moving direction.

(Fourth Modification)

The roadside unit 3 may determine whether the vehicle 2 is located in the vicinity of the roadside unit 3 using a method different from the method described above. For example, the roadside unit 3 may create the roadside unit information packet A1100 when receiving the vehicle information packet A600. In this modification, since the distance at which wireless communication between the roadside unit 3 and the vehicle 2 is possible is at most about 200 meters, the fact that the wireless communication can be performed (the vehicle information packet A600 can be received) certainly means that the vehicle 2 is located in the vicinity of the roadside unit 3. In addition to this example, the roadside unit information packet A1100 may be created when a sensor such as a camera senses that the vehicle 2 is located in the vicinity of the roadside unit 3. Furthermore, position information indicating the position of a base station that relays communication between the roadside unit 3 and the center server 5 may be saved beforehand in the application information A1107 illustrated in FIG. 10 such that this position information and the position of the vehicle 2 are compared to determine whether the vehicle 2 is located in the vicinity of the roadside unit 3.

As long as the features of the present invention are not impaired, the present invention is not limited to the above embodiment and other forms conceived within the technical idea of the present invention are included within the scope of the present invention.

The disclosure content of the following priority application is incorporated herein as a quotation.

Japanese Patent Application No. 2016-58929 (filed on Mar. 23, 2016)

REFERENCE SIGNS LIST 1 vehicle control network system
2 vehicle
3 roadside unit
110 GPS sensor
1100 outside-vehicle information processing unit
1200 inside-vehicle information processing unit
1300 abnormality processing unit
1301 comparison information acquiring unit
1302 abnormality detecting unit
1303 abnormality notifying unit
1304 GPS information DB
1305 reception information DB
1306 vehicle ECU Information DB

The invention claimed is:

1. An in-vehicle device comprising:
a storage device storing a control program; and
a central processing unit (CPU) mounted in a host vehicle and coupled to the storage device, the CPU configured to execute the control program stored in the storage device to:
acquire other position information representing a position of another vehicle as first comparison information, the other position information being acquired by wireless communication from the other vehicle located within a communicable distance from the host vehicle; and
detect an abnormality in a positioning device based on whether or not a distance based on position information of the host vehicle output from the positioning device mounted in the host vehicle and the other position information of the first comparison information is within a predetermined value based on the communicable distance.

2. An in-vehicle device comprising:
a storage device storing a control program; and
a central processing unit (CPU) mounted in a host vehicle and coupled to the storage device, the CPU configured to execute the control program stored in the storage device to:
acquire vehicle information relating to at least one of an advancing direction and a speed of the host vehicle as comparison information, and
detect an abnormality in a positioning device based on position information on a host vehicle output from the positioning device mounted in the host vehicle and the comparison information different from the position information,
wherein the detecting unit detects an abnormality in the positioning device by comparing an advancing direction and a speed of the host vehicle based on the vehicle information with an advancing direction and a speed of the host vehicle based on a plurality of pieces of the position information.

3. The in-vehicle device according to claim 1, wherein the CPU is further configured to:
transmit the position information acquired from the positioning device to outside of the host vehicle, and
stop transmitting the position information when an abnormality in the positioning device is detected.

4. The in-vehicle device according to claim 1, wherein the CIP is further configured to notify outside of the host vehicle that an abnormality in the positioning device has been detected when the abnormality is detected.

5. A vehicle comprising the in-vehicle device according to claim 1.

6. The in-vehicle device according to claim 1, wherein the position information of the host vehicle is GPS information of the host vehicle and the other position information is GPS information of the other vehicle.

7. The in-vehicle device according to claim 1, wherein the predetermined value is obtained by adding together the communicable distance and an error due to the positioning device accuracy.

* * * * *